Dec. 6, 1932.     H. HENKELS     1,889,803
DEVICE FOR THE MANUFACTURE OF SEPARABLE FASTENERS
Filed April 21, 1931     2 Sheets-Sheet 1
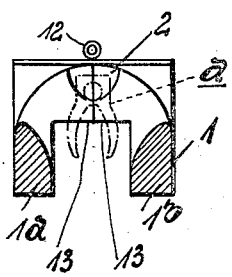
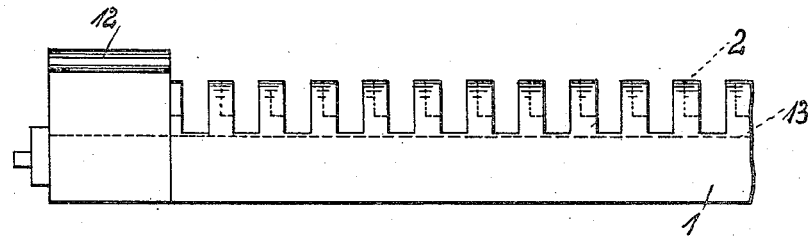
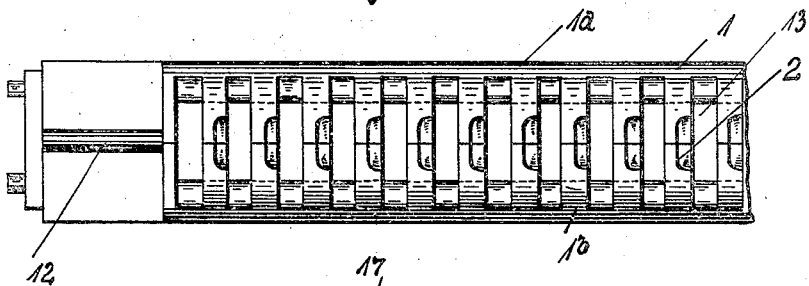
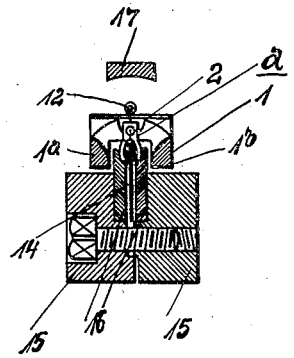
INVENTOR
Hugo Henkels
BY Warren E. Willis.
ATTORNEY Dec. 6, 1932.   H. HENKELS   1,889,803
DEVICE FOR THE MANUFACTURE OF SEPARABLE FASTENERS
Filed April 21, 1931   2 Sheets-Sheet 2
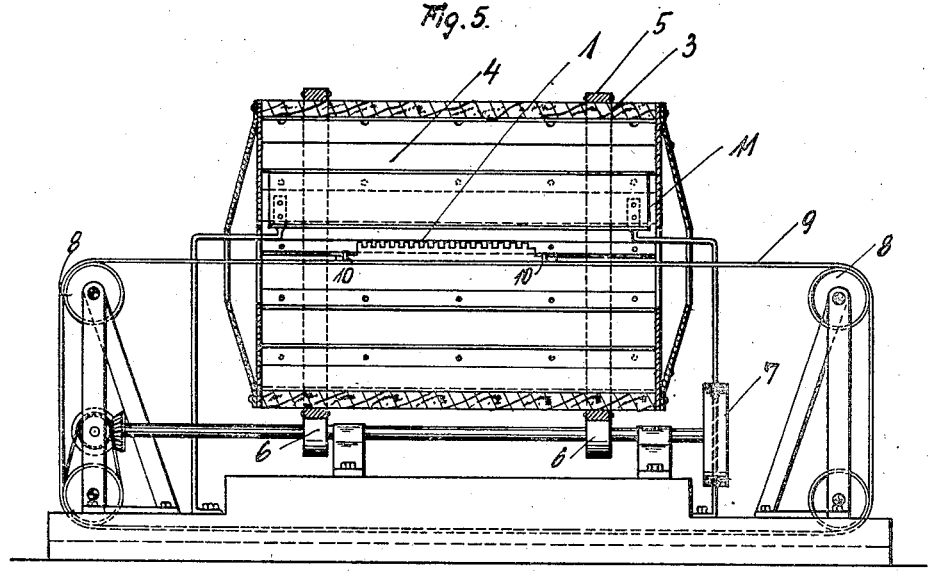
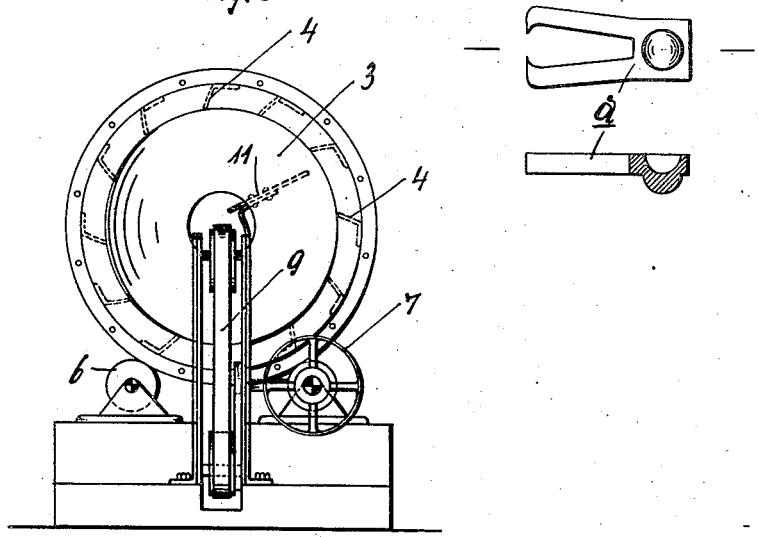
INVENTOR
Hugo Henkels
BY
Warren E. Willis.
ATTORNEY Patented Dec. 6, 1932

1,889,803

UNITED STATES PATENT OFFICE

HUGO HENKELS, OF WUPPERTAL-ELBERFELD, GERMANY

DEVICE FOR THE MANUFACTURE OF SEPARABLE FASTENERS

Application filed April 21, 1931, Serial No. 531,737, and in Germany August 13, 1930.

The present invention relates to an auxiliary device for the manufacture of separable fasteners by means of which a large number of fastener links, which are platelike in form, forked on one end, and provided on one side with an elevation corresponding to a depression on the other side, may be picked up from a jumbled pile of links, brought into correct position and spaced relation to one another, and may be simultaneously arranged on the band forming a part of the separable fastener. Compared with the method hitherto in use according to which each link had to be picked up individually, straightened, and then placed on the band, the auxiliary device proposed will simplify, accelerate, and cheapen the production of separable fasteners to a considerable degree.

The auxiliary device consists of a racklike bar with teeth and notches corresponding to the thickness of a fastener link and provided at the head of every tooth with a recess corresponding to the elevation of a fastener link all the recesses facing in the same direction along the longitudinal axis of the bar. When this bar is drawn through a jumble of fastener links or placed in a rotary drum filled with separable fastener links, the latter will be caught quickly in the notches, engage with their elevations the recesses at the head of one of the teeth, and oscillate about this point of suspension until they are in vertical position. On the side opposite the teeth the bar is finally provided with a longitudinal groove extending up to the root of the teeth to permit the links suspended from the bar to be placed with the latter directly on to the band of the separable fasteners, which engage the longitudinal groove. To facilitate the separation of the bar from the links placed on the band, the bar is divided along the central line of the groove and teeth, the two portions being articulated to one another at the toothed edge.

One form of the invention is illustrated in the accompanying drawings, in which Figure 1 is a side view of the device; Fig. 2, a top view thereof; Fig. 3, a cross sectional view of the device; Fig. 4, a top view and longitudinal section of a separable fastener link; Fig. 5, a side view of a drum for mechanically filling the auxiliary device with separable fastener links; Fig. 6, a cross sectional view of the drum; and Fig. 7, a view of the further treatment.

Referring to the drawings, 1 is a racklike bar having transverse notches dimensioned so as to accommodate a separable fastener link $a$, the width of the teeth corresponding amply to the thickness of a link. On every tooth a recess 2 is provided corresponding in shape and dimensions to the elevation on one side of the links. When this bar is passed through a jumble of links, the elevations of suitably disposed links will embed themselves in the recesses 2 and be caught. The links positioned so that their elevation fails to engage a recess 2 during the motion of the bar 1 are forced aside by the latter. Preferably, the apex of the teeth is rounded off in transverse direction of the bar 1 to facilitate the passage of the latter through a pile of links, and if the bar 1 is then raised after having been passed through the heap several times, the links oscillate in the elevations and become adjusted in a vertical position. The links suspended from the bar 1 are spaced equidistantly and arranged so that their elevations are on the same axis and point in the same direction. It has been found that female workers possessing only little skill are able to fill the bar up to 90% of its capacity in a very short time by passing it through a pile several times, the remaining 10% being filled by hand. The bars 1 can be filled still more quickly and completely by introducing them axially into a rotary drum 3 containing a large amount of links $a$ and fitted with the ribs 4 which lift up a portion of the links $a$ and let them trickle over the bar 1. The drum 3 rests with its running rings 5 on the rolls 6 which are driven by suitable means, such as the pulley 7, and drive the drum 3 by friction or gearing. Through the drum 3, which is open on both ends, passes one side of an endless band 9 guided over the rolls 8 and receiving the bars to be filled prior to their entering the drum. The bars 1 are held in position relative to the band 9 by means of the clamping springs 10 or the like, and the speed at which they pass through the drum 3 is timed so that they are practically filled on emerging from the drum. To aid the filling process, an oblique and stationary guide plate 11 is disposed near the band 9, which catches a large portion of the dropping links and feeds them to the bar 1 moved past its lower edge.

The links *a* arranged on the bar 1 project beyond the latter and can thus be caught by a clamping device to be put on the bar 1, and lifted therefrom. By means of the clamping device the links *a* can be placed with their forked ends extending beyond the clamping device on the thickened edge of the band 14. The collecting bar is constructed so that the links carried by it can be placed directly on the band with the bar 1 which, for this purpose, consists of two flat superimposed symmetrical ledges 1*a* and 1*b* interconnected by the hinges 12 arranged approximately on a level with the apexes of the teeth. It suffices, as a rule, to provide hinges at the ends of each bar. On the sides facing each other the two ledges 1*a* and 1*b* are provided with a recess 13 extending over their entire length and from the edge of the bar opposite the teeth up to the root of the teeth so that the notches are in direct communication with this recess. The links *a* taken up by the collecting bar 1 extend with their forked ends into this recess 13 and can thus be placed without trouble on the band 14 introduced into the recess 13, the band 14 being preferably fixed between the two jaws 15 so as to project with its thickened edge beyond the jaws 15. On either side of the band 14 a sheet metal comb 16 is fixed in the jaws 15, the notches of the comb 16 corresponding to the width of the links while its pitch coincides with that of the bar 1. When the bar 1 is placed on the fixed band 14, the links enter with their forked end the notches of the combs 16 and are thus straightened again and held so that they cannot be displaced during further treatment. Shocks imparted to the collecting bar 1 cause the links to be pressed firmly on to the band reinforced by the combs 16, the shocks being applied indirectly to the bar 1 by the interposition of a pressure ledge 17 put on the bar 1 to protect it against damage. When the links are firmly arranged on the band 14, the two ledges 1*a* and 1*b* are unfolded and release the pins of the links so that the collecting bar 1 may be lifted off from the links and used again for picking up other links which are fastened to the band in the known manner by pressing together the two fork sides overlapping the band.

I claim:—

1. A device for arranging separable fasteners upon a band comprising a rack-like bar, its teeth and notches corresponding in width to the thickness of a separable fastener link, each tooth being provided at one side with a recess corresponding in form and size to an elevation on one side of the fastener link, all of the recesses facing in a direction along the longitudinal axis of said bar.

2. A device for disposing separable fasteners upon a band comprising a rack-like bar, its teeth and notches corresponding in width to the thickness of a separable fastener link, each tooth being provided at one side with a recess corresponding in form and size to an elevation on one side of the fastener link, the recesses all facing in a direction along the longitudinal axis of said bar, and said bar having a longitudinal slot extending up to the root of the teeth on the side opposed to the teeth.

3. A device for arranging separable fasteners upon a band comprising a rack-like bar, its teeth and notches corresponding in width to the thickness of a separable fastener link, each tooth being provided at one side with a recess corresponding in form and size to an elevation on one side of the fastener link, all of the recesses facing in a direction along the longitudinal axis of said bar, said bar having a longitudinal slot extending up to the root of the teeth on the side opposed to the teeth, the teeth of said bar being rounded off in a direction transverse to said bar.

4. A device for arranging separable fasteners upon a band comprising a drum mounted to rotate on a horizontal axis, said drum adapted to receive a plurality of separable fastener links and open at both ends, means to rotate said drum, ribs in said drum to agitate the links, an endless band passing endwise through the center of said drum, and through the openings in both ends thereof horizontally, and a series of link collecting bars carried by said band.

5. A device for arranging separable fasteners upon a band comprising a drum mounted to rotate on a horizontal axis, said drum adapted to receive a plurality of separable fastener links and open at both ends, means to rotate said drum, an endless band trained through said drum, and extending outwardly beyond the ends thereof, in a horizontal plane, driving connections between said shaft and band, a plurality of link collecting bars detachably engaged on said band, and an oblique guide plate supported within said drum to divert links upon said bars.

6. In a device for the manufacture of separable fasteners, a rack-like bar, teeth on said bar the spaces between which correspond in width to the thickness of a separable fastener link, bearing recesses in said teeth, all of the recesses facing in one direction, and each recess being adapted to receive a projection provided on one side of a separable fastener link.

7. In a device for the manufacture of separable fasteners, a rack-like bar provided with teeth, the teeth and notches of which correspond in width to the thickness of a separable fastener link, bearing recesses in said teeth directed toward one end of said bar, each of the bearing recesses being adapted to receive a projection provided on one side only of the separable fastener links, said bar having a longitudinal slot in its face opposite the teeth thereof, the slot extending to the root of the teeth of said bar.

8. In a device for the manufacture of separable fasteners, a rack-like bar, the teeth and notches of which correspond in width to the thickness of a separable fastener link, bearing recesses in the teeth, the bearing recesses being adapted to receive a projection provided on one face of each of the separable fastener links, said bar having a longitudinal slot in its face opposite to the teeth, the slot extending to the root of the teeth, and said bar being divided into two longitudinal parts along the center line of the teeth and slot, the two parts being operatively connected together.

9. In a device for the manufacture of separable fasteners, a rack-like bar having rectangular teeth the teeth and notches of which correspond in their width to the thickness of a separable fastener link, bearing recesses in the teeth, each of the bearing recesses adapted to receive one of the projections provided on one of the faces of the separable fastener links, said bar having a longitudinal slot in its face opposite the teeth, the slot extending to the roots of said teeth, the bar being divided into two parts along the center line of said teeth and the slot, and a hinge on said bar connecting the parts of said bar operatively together.

10. In a device for the manufacture of separable fasteners, a rack-bar having rectangular teeth, the teeth and notches of which correspond in their width to the thickness of a separable fastened link, bearing recesses in one of the faces of each tooth all pointing in one direction, each of the bearing recesses being adapted to receive a projection provided on one of the faces of the separable fastener links, and the faces of the teeth being rounded off in a direction transverse to said bar.

11. In a device for the manufacture of separable fasteners, a rack-like bar having straight teeth, the teeth and notches of which correspond in width to the thickness of a separable fastener link, bearing recesses in each tooth all facing in one and the same direction, each of the bearing recesses being adapted to receive one of the projections provided on one of the faces of the separable fastener links, the faces of the teeth being rounded off in transverse direction to said bar, said bar having a longitudinal slot in its face opposite to the teeth, the slot extending to the root of the teeth.

12. In a device for the manufacture of separable fasteners, a rack-like bar having straight teeth, the teeth and spaces therebetween corresponding in width to the thickness of a separable fastener link, bearing recesses in the teeth, each of the bearing recesses facing in a direction along the longitudinal axis of said bar and being adapted to receive a projection provided on the faces of the separable fastener links, the faces of said teeth being rounded off in transverse direction to said bar, said bar having a longitudinal slot in the face, the slot extending to the root of said teeth, said bar being divided into two longitudinal parts along its center line and the slot, said parts being operatively connected.

13. In a device for the manufacture of separable fastener links, a rack-like bar, straight teeth on said bar, the teeth and notches of which correspond to the thickness of a separable fastener link, bearing recesses in the teeth all facing in one direction, each of the recesses being adapted to receive a projection on one of the faces of the links, a horizontal shaft, a drum on said shaft adapted to rotate therewith and to receive said bar and a plurality of links, and ribs provided in said drum, the ribs being adapted to lift the links and to let them drop on said bar during rotation of said drum.

14. In a device for the manufacture of separable fastener links, a rack-like bar having straight parallel teeth, the teeth and notches corresponding in their width to the thickness of a separable fastener link, bearing recesses in said teeth facing in a direction along the longitudinal axis of the bar, each of the bearing recesses being adapted to receive a projection provided on the face of each of the links, said rack-like bar having a longitudinal slot in its face opposite to the teeth of said bar, the slot extending to the roots of the teeth, a horizontal shaft, a drum on said shaft to rotate about the shaft and to receive said bar and a plurality of the links, and ribs in said drum adapted to lift the links and to let them drop on said bar during rotation of said drum.

15. In a device for the manufacture of separable fasteners, a rack-like bar having parallel teeth, the teeth and notches corresponding to the thickness of a separable fastener link, bearing recesses in each tooth, all facing in one direction, each of the bearing recesses being adapted to receive a projection provided on one of the faces of each link, said rack-like bar having a longitudinal slot in its face opposite to the roots of the teeth, the slot extending to the roots of the teeth, said rack-like bar being divided into two parts along the center line of said teeth and the slot, the two parts being operatively connected, a drum on said shaft adapted to rotate thereabout and to receive said rack-like bar and a plurality of the links, and ribs provided in said drum adapted to lift the links and to let them drop on said rack-like bar during rotation of said drum.

16. In a device for the manufacture of separable fasteners, a rack-like bar having parallel teeth the spaces between which correspond in width to the thickness of a separable fastener link, bearing recesses in the teeth of said bar, each recess being adapted to receive a projection on one of the faces of the links, said bar having a longitudinal slot in its face opposite to the teeth, the slot extending to the roots of the teeth, said bar being divided into two parts along the center line of the teeth and slot, a hinge connecting the two parts of the bar operatively, a horizontal shaft, a drum on said shaft to rotate therewith and to receive said bar and a plurality of the fastener links, and ribs provided in said drum, said ribs being adapted to lift the fastener links and to let them drop on said bar during rotation of said drum.

17. In a device for the manufacture of separable fasteners, a rack-like bar, teeth on said bar, the teeth and notches corresponding in their width to the thickness of a separable fastener link, bearing recesses in the teeth adapted to receive projections on one of the faces of each of the fastener links, a horizontal shaft, a drum fixed on said shaft, said drum adapted to receive said bar and a plurality of the fastener links, means for holding said bar within said drum and during its rotation, and ribs in said drum adapted to lift the fastener links and to let them drop on said bar during rotation of the drum.

18. In a device for the manufacture of separable fasteners, a rack-like bar having straight flanked teeth and notches corresponding in thickness to a separable fastener link, bearing recesses in each of the teeth, the bearing recesses being adapted to receive a projection on one of the faces of each of the fastener links, a horizontal shaft, a drum, said shaft adapted to receive a plurality of fastener links, an endless belt passing through and beyond the ends of said drum and carrying said bar, ribs in said drum adapted to lift the fastener links and to let them drop on said bar during rotation of the drum.

19. In a device for the manufacture of separable fasteners, a rack-like bar having straight parallel teeth, the spaces between the teeth corresponding to the thickness of a separable fastener link, bearing recesses in the teeth facing in one direction, each of the bearing recesses adapted to receive one of the single projections provided on one of the faces on each fastener link, said bar having a longitudinal slot extending to the roots of the teeth, a horizontal shaft, a drum on said shaft to receive a plurality of fastener links, an endless belt passing through and beyond the ends of said drum and carrying said bar, ribs in said drum adapted to lift the fastener links and to let them drop on said bar during rotation of the drum.

20. In a device for the manufacture of separable fasteners, a rack-like bar having straight teeth and notches corresponding in width to the thickness of a fastener link, bearing recesses in the teeth, each recess facing in the direction of the longitudinal axis of the bar and adapted to receive one of the single projections provided on one of the faces of the fastener links, said bar having a longitudinal slot extending to the roots of the teeth and being divided into two parts along the center line of the teeth and slot, the two parts being operatively connected, a horizontal shaft, a drum on said shaft adapted to rotate about the shaft, and to receive a plurality of fastener links, an endless belt passing entirely through the ends of said drum and adapted to carry said bar, and ribs in said drum to lift the fastener links and to let them drop on said bar during rotation of the drum.

21. In a device for the manufacture of separable fasteners, a rack-like bar having straight teeth and notches to correspond in width to the thickness of a fastener link, bearing recesses in the teeth each being adapted to receive one projection provided on one of the faces of each of the fastener links, a longitudinal slot in said bar extending to the roots of the teeth, said bar being divided into two parts along the center line of the teeth and slot, a hinge operatively connecting the two parts of said bar, a horizontal shaft, a drum on said shaft adapted to rotate about the shaft and to receive a plurality of fastener links, an endless belt passing through and beyond the ends of said drum adapted to carry said bar, and ribs in said drum to lift the fastener links and to let them drop on the bar during rotation of the drum.

22. In a device for the manufacture of separable fasteners, a rack-like bar having straight teeth and notches corresponding in width to the thickness of a separable fastener link, a bearing recess in each tooth, each recess adapted to receive a projection provided on one of the faces of each of the fastener links, a horizontal shaft, a drum on said shaft adapted to receive a plurality of fastener links and to rotate about said shaft, an endless belt passing through both ends of said drum and adapted to carry said bar, means on said belt for holding the bar in connection therewith, and ribs in said drum to lift the fastener links and to let them drop on said bar during rotation of the drum.

23. In a device for the manufacture of separable fasteners, a rack-like bar having straight parallel teeth their spaces corresponding to the thickness of a separable fastener link, a bearing recess in the forwardly moving faces of each tooth, each of the bearing recesses being adapted to receive a projection provided on one of the faces of each fastener link, a horizontal shaft, a drum on said shaft adapted to rotate about said shaft and to receive a plurality of fastener links, an endless belt passing through the ends of said drum and adapted to carry said bar, means on said belt to connect the bar with the belt, ribs in the drum to lift the fastener links and to let them drop on said bar during rotation of the drum, and a stationary guide plate within said drum adapted to catch a large proportion of the dropping links and to feed them to the bar when moving past the lower edge of said guide plate.

HUGO HENKELS.